United States Patent [19]
Eguchi et al.

[11] Patent Number: 5,665,444
[45] Date of Patent: Sep. 9, 1997

[54] TUBE-SHAPED FILM HAVING ITS INNER PERIPHERAL SURFACE TREATED, METHOD FOR TREATING INNER PERIPHERAL SURFACE OF TUBE-SHAPED FILM AND APPARATUS THEREFOR

[75] Inventors: Yosuke Eguchi; Atsuki Wada; Tomohiro Nagase; Yoshiro Hirajima, all of Neyagawa, Japan

[73] Assignee: Kurashiki Boseki Kabushiki Kaisha, Kurashiki, Japan

[21] Appl. No.: 693,130

[22] PCT Filed: Jan. 17, 1996

[86] PCT No.: PCT/JP96/00051

§ 371 Date: Aug. 13, 1996

§ 102(e) Date: Aug. 13, 1996

[87] PCT Pub. No.: WO96/22323

PCT Pub. Date: Jul. 25, 1996

[30] Foreign Application Priority Data

Jan. 18, 1995 [JP] Japan ................................ 7-005731

[51] Int. Cl.⁶ .................................................. B29D 22/00
[52] U.S. Cl. ........................... 428/36.91; 118/50; 118/57; 118/64; 118/66; 118/318; 118/320; 118/416; 118/428; 118/503; 118/622; 427/177; 427/207.1; 427/238; 427/296; 427/346; 427/350; 427/393.5; 427/425; 427/403.1; 427/458; 427/512; 427/516; 427/554; 427/558; 427/559; 427/596; 428/421; 428/422

[58] Field of Search .................... 118/50, 57, 64, 118/66, 318, 320, 416, 428, 503, 622; 427/177, 207.1, 238, 296, 346, 350, 393.5, 425, 430.1, 458, 512, 516, 554, 558, 559, 596; 428/36.91, 421, 422

[56] References Cited

FOREIGN PATENT DOCUMENTS

| 2-196834 | 8/1990 | Japan. |
|---|---|---|
| 3-62831 | 3/1991 | Japan. |
| 5-59195 | 3/1993 | Japan. |
| 5-86222 | 4/1993 | Japan. |
| 5-339396 | 12/1993 | Japan. |
| 6-248097 | 9/1994 | Japan. |

*Primary Examiner*—Bernard Pianalto
*Attorney, Agent, or Firm*—Wenderoth, Lind & Ponack

[57] ABSTRACT

A tube-shaped film, made of fluorine resin, has a fold-free, smooth, and uniform inner peripheral surface formed thereon by a surface treatment. An apparatus for treating the inner peripheral surface of the tube-shaped film includes a holding device for holding the tube-shaped film on the inner peripheral surface of a cylindrical body with a cylindrical configuration of the tube-shaped film maintained. A treatment device is inserted into the cylindrical body to treat the inner peripheral surface of the tube-shaped film held on the inner peripheral surface of the cylindrical body. The holding device and the treatment device make a uniform linear motion relative to each other and a uniform rotary motion relative to each other.

16 Claims, 4 Drawing Sheets

TUBE-SHAPED FILM HAVING ITS INNER PERIPHERAL SURFACE TREATED, METHOD FOR TREATING INNER PERIPHERAL SURFACE OF TUBE-SHAPED FILM AND APPARATUS THEREFOR

TECHNICAL FIELD

The present invention relates to a tube-shaped film having its inner peripheral surface treated and to an apparatus and to a method for treating the inner peripheral surface of the tube-shaped film, and more particularly to a tube-shaped film made of uniform fluorine having an adhesive property of a high degree applied to its inner peripheral surface and to an apparatus and to a method suitable for producing such a tube-shaped film.

BACKGROUND ART

The peripheral surface of a roll is covered with a tube-shaped film made of fluorine resin or fluorine resin containing carbon black which is conductive. The roll includes rolls for use in a printing machine, a rolling machine, and a drier; and a fixing heating roll, a fixing pressurizing roll, an electrostatic charging roll, a cleaning roll, a developing roll, a transfer roll for use in a copying machine, a printer, and a facsimile of electrophotographic type.

Generally, fluorine resin is superior to resin made of other substances in water repellency, oil repellency, slidableness, stain-proofing property, heat-resistant property, chemical-resistant property, and electrical characteristic. Thus, fluorine resin is widely used. Because the surface of the fluorine resin is inert, it is difficult to apply adhesive agent or paint thereto and thus it is difficult to combine fluorine resin with other materials. Various treating methods have been hitherto proposed to allow surface of fluorine resin to be adhesive or wettable. As a known art for treating the inner peripheral surface of a very thin film tube, one end of a film tube is closed and surface-treating liquid is injected from its other end which is open to stay the surface-treating liquid above the closed one end, as disclosed in Laid-Open Japanese Patent Publication No. 5-59195. As another known art, the outer peripheral surface of a film tube is treated with liquid chemical and then, the tube is cut to a plurality of predetermined lengths, and each tube is turned inside out by using a jig to obtain a tube-shaped film whose inner peripheral surface is treated, as disclosed Laid-Open Japanese Patent Publication No. 5-86222.

In the above-described conventional treating methods, liquid chemical is applied to the inner peripheral surface of the tube-shaped film. According to the disclosure made in Laid-Open Japanese Patent Publication No. 5-339396, in order to allow the surface of fluorine resin to be adhesive and wettable, after a light-absorbing substance is attached to the surface thereof, the surface is irradiated with ultraviolet laser beams. Effective methods of treating the surface of the tube-shaped film by applying liquid chemical thereto have been established as described above, whereas effective methods of treating the surface of the tube-shaped film by irradiating the surface with optical energy such as ultraviolet laser beams have not been established.

In the conventional treating methods disclosed in Laid-Open Japanese Patent Publication Nos. 5-59195 and 5-86222, folds are formed in the tube-shaped film. That is, the conventional treating methods are incapable of providing the tube-shaped film having no folds generated on the entire surface of the inner peripheral surface thereof. More specifically, in the method disclosed in Laid-Open Japanese Patent Publication No. 5-59195, the tube is sandwiched under pressure between a pair of pinch rollers. As a result, a striped fold is formed at the portion grasped with the pinch rollers. In the method disclosed in Laid-Open Japanese Patent Publication No. 5-86222, in dipping the tube-shaped film in a tank containing liquid chemical, the rolled film is unrolled to feed it along a guide roller with the film sandwiched between the pinch rollers and the guide roller. That is, because the film is rolled on a roller by making the cylindrical configuration into a flat configuration, folds are formed therein.

DISCLOSURE OF THE INVENTION

The present invention has been developed to solve the above described disadvantages. It is accordingly an object of the present invention to provide a tube-shaped film, made of fluorine resin, the inner surface of which is treated uniformly without folds being formed therein to allow the inner surface thereof to be adhesive and wettable. The uniformity thus formed cannot be lost, even though the inner surface of the tube is irradiated with laser beams in a normal nonuniform manner.

It is another object of the present invention to provide an apparatus and a method suitable for treating the inner peripheral surface of the tube-shaped film uniformly by subjecting the inner peripheral surface thereof to optical energy such as laser beams or wave energy including ultrasonic waves and electromagnetic waves, or the like.

The tube-shaped film in accordance with the present invention is made of fluorine resin and has a fold-free, smooth, and uniform inner peripheral surface formed by applying pre-treatment liquid containing an ultraviolet-absorbing compound and fluorosurfactant to the inner peripheral surface thereof and then irradiating the inner peripheral surface thereof with ultraviolet laser beams to impart adhesiveness and wettability thereto.

A tube-shaped film made of fluorine resin contains an ultraviolet-absorbing compound and has a fold-free, smooth, and uniform inner peripheral surface formed thereon by irradiating the tube-shaped film with ultraviolet laser beams to impart adhesiveness and wettability thereto.

A conductive substance may be contained in the fluorine resin.

In order to solve the above-described conventional technical problems and achieve the objects of the present invention, the apparatus for treating the inner peripheral surface of the tube-shaped film according to the present invention has the following construction: That is, the apparatus comprises a holding means for holding the tube-shaped film on the inner peripheral surface of a cylindrical body, with the cylindrical configuration of the tube-shaped film maintained; and a treatment means to be inserted into the cylindrical body to treat the inner peripheral surface of the tube-shaped film held on the inner peripheral surface of the cylindrical body.

The holding means comprises an inner cylinder having a plurality of holes formed thereon to hold the tube-shaped film thereon by suction; and an outer cylinder surrounding the inner cylinder and connected with a negative pressure source to form a negative pressure space between the inner cylinder and the outer cylinder.

In the holding means, the tube-shaped film may be brought into close contact with the inner peripheral surface of a holding cylindrical body under positive pressure by blowing gas such as air into the space surrounded by the tube-shaped film after inserting the tube-shaped film into the holding cylindrical body.

Further, in the holding means, after the tube-shaped film is inserted into the holding cylindrical body, gas such as air is blown into the space surrounded by the tube-shaped film so as to pressurize the space, with an adhesive substance applied to the inner peripheral surface of the holding cylindrical body. In this manner, the tube-shaped film can be brought into close contact with the inner peripheral surface of the holding cylindrical body by the adhesive substance even though the pressurization is stopped. In addition to pressurization, the tube-shaped film held on the inner peripheral surface of the holding cylindrical body may be sucked from outside the holding cylindrical body. After the tube-shaped film is brought into close contact with the inner peripheral surface of the holding cylindrical body by the adhesive substance, the pressurization and the suction may be stopped. It is necessary that the adhesive substance is adhesive to such an extent as to keep the tubular configuration of the film while the surface treatment onto the inner peripheral surface of the tube-shaped film is being performed and is adhesive to such an extent that the tube-shaped film is removed easily therefrom after the surface treatment is completed.

In the holding means, instead of using the adhesive property of the adhesive substance, the tube-shaped film can be brought into close contact with the inner peripheral surface of the holding cylindrical body by means of an electrostatic attraction force acting between the holding cylindrical body and the tube-shaped film. The holding cylindrical body or the tube-shaped film may be charged.

The holding means may and the treatment means may make a uniform linear motion relative to each other along the axis of the holding means and a uniform rotary motion relative to each other around the axis of the holding means. That is, with the holding means being fixed the treatment means makes both a linear motion, and a rotary motion or with the treatment means being fixed, the holding means makes both a linear motion and a rotary motion. Instead, the treatment means may make the linear motion and the holding means may make the rotary motion and vice versa. If both the treatment means and the holding means make a uniform linear motion or a uniform rotary motion, both means are capable of making the linear motion and the rotary motion simultaneously.

For example, if the treatment means has a length equal to the entire length of the tube-shaped film held on the inner peripheral surface of the holding means, the holding means and the treatment means make only a uniform rotary motion relative to each other on the axis of the holding means. That is, in this construction, the uniform linear motion to be made relative to each other can be omitted.

If the treatment means may be provided throughout the circumference of the inner peripheral surface of the tube-shaped film held on the inner peripheral surface of cylinder of the holding means, the holding means and the treatment means make only a uniform linear motion relative to each other along the axis of the holding means. That is, in this construction, the uniform rotary motion to be made relative to each other can be omitted.

The apparatus for treating the inner peripheral surface of the tube-shaped film according to the present invention comprises a suction/holding means having an inner cylinder having a plurality of holes formed thereon to hold the tube-shaped film thereon by sucking the tube-shaped film thereto; and an outer cylinder surrounding the inner cylinder and connected with a negative pressure source to form a negative space between the inner cylinder and the outer cylinder; a first driving means for driving the suction/holding means so that the suction/holding means makes a uniform linear motion along the axis thereof; a second driving means for driving the suction/holding means so that the suction/holding means makes a uniform rotary motion around the axis thereof; and a treatment means for treating the inner peripheral surface of the tube-shaped film held by the suction/holding means, according to the linear motion and the rotary motion of the sucking/holding means.

The treatment means may be a supply means for supplying the treatment liquid to the inner peripheral surface of the tube-shaped film. In addition to an application means such as a brush which contacts the inner peripheral surface of the tube-shaped film, the supply means may include a spray means such as a nozzle for applying the treatment liquid to the inner peripheral surface of the tube-shaped film without contact therewith or a dripping means for dripping treatment liquid thereon.

The tube-shaped film may be made of fluorine resin containing an ultraviolet-absorbing compound and the treatment means may be an irradiation means for irradiating ultraviolet laser beams. It is also possible that the tube-shaped film is made of fluorine resin and the treatment means may comprise a supply means for supplying pre-treatment liquid containing the ultraviolet-absorbing compound and fluorosurfactant; and an irradiation means, for irradiating ultraviolet laser beams, having an optical means for reflecting ultraviolet laser beams guided along the axial direction of the cylinder and refracting them toward the inner peripheral surface of the tube-shaped film.

In order to solve the above-described conventional technical problems and achieve the objects of the present invention, the method for treating the inner peripheral surface of the tube-shaped film according to the present invention has the following characteristics. That is, The method of treating an inner peripheral surface of a tube-shaped film may comprise the steps of a first step of holding the tube-shaped film made of fluorine resin on the inner peripheral surface of a holding cylinder having a large number of holes, by means of a negative pressure generated between the holding cylinder and an outer cylinder; a second step of supplying the inner peripheral surface of the tube-shaped film with a pre-treatment solution containing an ultraviolet-absorbing compound and fluorosurfactant and attaching the pre-treatment solution thereto by means of a supply means inserted into the holding cylinder holding the tube-shaped film, by linearly moving the holding cylinder and the supply means relative to each other at a uniform speed along the axis of the holding cylinder and rotating the holding cylinder and the supply means relative to each other at a uniform speed around the axis of the holding cylinder; and a third step of irradiating the inner peripheral surface of the tube-shaped film to which the pre-treatment solution has attached, with ultraviolet laser beams by refracting the ultraviolet laser beams guided along the axial direction of the holding cylinder toward the inner peripheral surface of the tube-shaped film by means of an optical means inserted into the holding cylinder holding the tube-shaped film, by linearly moving the holding cylinder and the optical means relative to each other at a uniform speed along the axis of the holding cylinder and rotating the holding cylinder and the optical means relative to each other at a uniform speed around the axis of the holding cylinder.

In the method for treating the inner peripheral surface of the tube-shaped film according to the present invention, the supply of the pre-treatment solution to the inner peripheral surface of the tube-shaped film to be performed at the second step is carried out without contact between the inner peripheral surface of the tube-shaped film and the supply means. During the uniform rotary motion of the holding cylinder and the supply means relative to each other, at least the holding cylinder makes the uniform rotary motion along the axis thereof, and the uniform rotary motion of the holding means is made at a speed higher than a speed at which centrifugal force acts on the pre-treatment solution so that the pre-treatment solution supplied to the inner peripheral surface of the tube-shaped film can be uniformly distributed thereon.

The method further may comprise a fourth step, provided between the second step and the third step, for drying the pre-treatment solution which has attached to the inner peripheral surface of the tube-shaped film, wherein at the fourth step, the holding means rotates at the speed higher than the speed at which the centrifugal force acts on the pre-treatment solution so that the pre-treatment solution supplied to the inner peripheral surface of the tube-shaped film can be uniformly distributed thereon.

The method of treating the inner peripheral surface of a tube-shaped film may comprise the steps of a first step of holding a tube-shaped film made of fluorine resin containing an ultraviolet-absorbing substance on the inner peripheral surface of a holding cylinder having a large number of holes, by means of a negative pressure; and a second step of irradiating the inner peripheral surface of the tube-shaped film with ultraviolet laser beams guided along the axial direction of the holding cylinder by refracting the ultraviolet laser beams toward the inner peripheral surface of the tube-shaped film by means of an optical means, while the holding cylinder holding the tube-shaped film by suction makes a uniform linear motion along the axis thereof and a uniform rotary motion around the axis thereof. As the optical means, a mirror, a prism or an optical fiber can be effectively employed.

According to the present invention, the tube-shaped film is held on the inner peripheral surface of the holding cylinder by suction, pressurization, adhesion, or static electricity which acts uniformly thereon. Thus, even though the tube-shaped film is made of fluorine resin and thus is very thin and has a very small friction, the tube-shaped film can be held on the inner peripheral surface of the holding cylinder with no folds formed therein and the original configuration thereof maintained. Accordingly, the property-improving auxiliary agent can be uniformly applied to the inner peripheral surface of the tube-shaped film, and the inner peripheral surface of the tube-shaped film can be irradiated with laser beams uniformly. In particular, centrifugal force utilized to apply the property-improving auxiliary agent to the inner peripheral surface of the tube-shaped film allows liquid chemical to be uniformly distributed thereon to a higher degree, thus contributing to the production of the tube-shaped film having a uniformly improved inner peripheral surface thereof.

BRIEF DESCRIPTION OF DRAWINGS

These and other objects and features of the present invention will become clear from the following description of preferred embodiments thereof with reference to the accompanying drawings throughout which like parts are designated by like reference numerals, and in which.

BEST MODE FOR CARRYING OUT THE INVENTION

Figure 1:
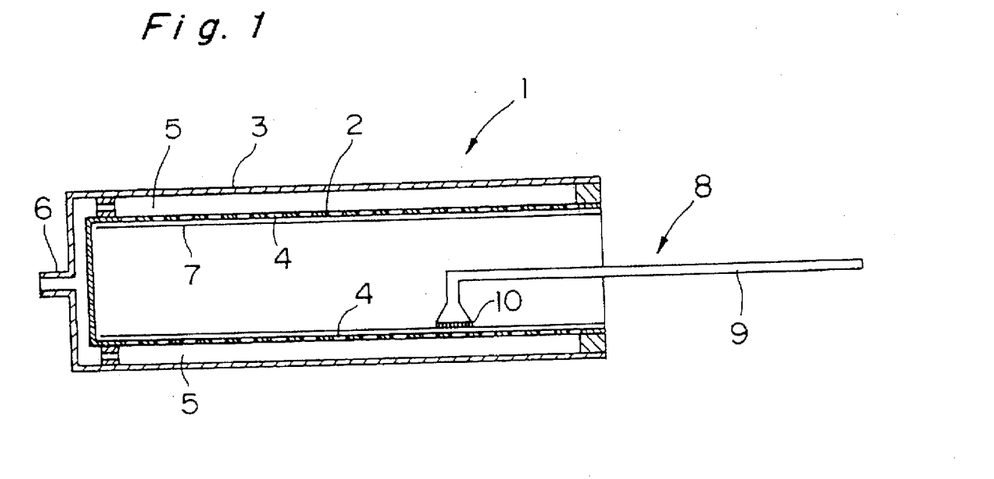
FIG. 1 is a sectional view showing a schematic construction of a sucking/holding cylinder of an apparatus for treating the inner peripheral surface of a tube-shaped film and that of an applying section for applying property-improving auxiliary agent to the inner peripheral surface thereof.

FIG. 1 is a sectional view showing a schematic construction of a sucking/holding cylinder 1 of an apparatus for treating the inner peripheral surface of a tube-shaped film 7 and that of an applying section for applying property-improving auxiliary agent to the inner peripheral surface of the tube-shaped film. The sucking/holding cylinder 1 has a double construction. That is, the sucking/holding cylinder 1 comprises an inner cylinder 2 and an outer cylinder 3. The inner cylinder 2 is entirely open at one end and closed at the other end. The inner diameter of the inner cylinder is equal to that of a tube-shaped film, the inner surface of which is to be treated. The inner cylinder 2 has a large number of through-holes 4 uniformly distributed on the entire peripheral surface thereof. The outer cylinder 3 coaxial with the inner cylinder 2 covers the peripheral surface and the closed end of the inner cylinder 2, with a gap 5 formed between the outer cylinder 3 and the inner cylinder 2. The gap 5 is terminated by connecting the open end of the inner cylinder 2 and the one end of the outer cylinder 3 at a same side. The outer cylinder 3 has a connection opening 6 formed at its end surface opposite to the end connected with the open end of the inner cylinder 2. The connection opening 6 is connected with a vacuum pump 16 (see FIG. 3). The tube-shaped film 7 is inserted into the sucking/holding cylinder 1 having the above-described construction, with no fold formed therein. Then, the vacuum pump 16 is actuated to suck air present between the inner cylinder 2 and the outer cylinder 3. As a result, a negative pressure is generated in the gap 5 and the air in the inner cylinder 2 is introduced into the gap 5 through the through-holes 4. As a result of such suction operation, the tube-shaped film 7 is uniformly held on the inner peripheral surface of the inner cylinder 2 without folds or creases.

An applying section 8 for applying property-improving auxiliary agent to the inner peripheral surface of the tube-shaped film 7 held inside the sucking/holding cylinder 1 without folds formed therein includes, an auxiliary agent-supply pipe 9 extending in parallel with the axial direction of the sucking/holding cylinder 1 and bent at an angle of 90° and has an application brush 10 mounted at the leading end thereof. When the sucking/holding cylinder 1 holding the tube-shaped film 7 travels in the axial direction thereof to insert the applying section 8 thereinto, the leading end of the application brush 10 contacts the inner peripheral surface of the tube-shaped film 7. When the sucking/holding cylinder 1 starts rotating, with the application brush 10 in contact with one end of the tube-shaped film 7, the property-improving auxiliary agent is applied to the tube-shaped film 7 in the circumferential direction thereof. While the sucking/holding cylinder 1 is traveling axially, the property-improving auxiliary agent is applied to the entire inner peripheral surface of the tube-shaped film 7. If the rotation speed of the sucking/holding cylinder 1 and the linear speed thereof in its axial direction are constant, the auxiliary agent is applied to the entire inner peripheral surface of the tube-shaped film 7 uniformly. In the above description, the sucking/holding cylinder 1 makes a uniform rotary motion and a uniform linear motion simultaneously, with the applying section 8 stationary. But needless to say, the applying section 8 may rotate and travel linearly, with the sucking/holding cylinder 1 stationary. It is also possible to rotate the former and move the latter linearly or rotate the latter and move the former linearly.

Figure 2:
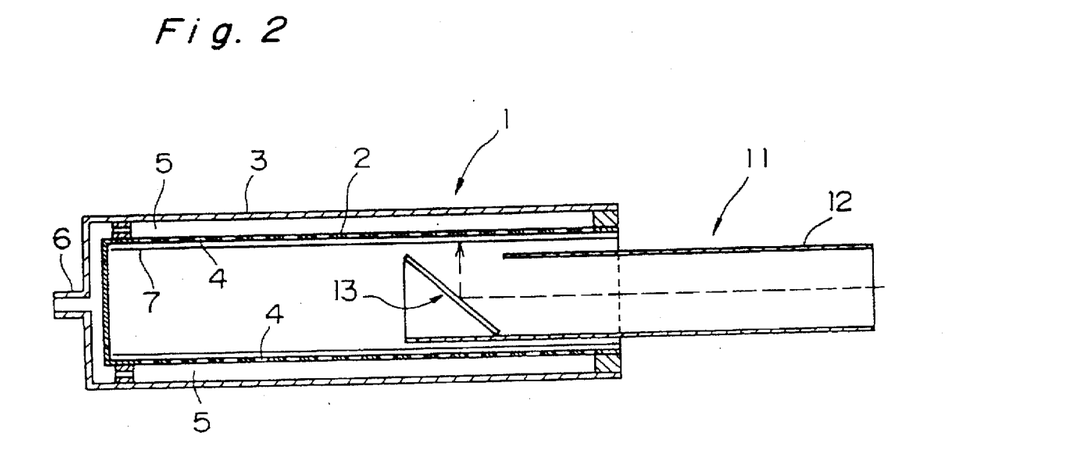
FIG. 2 is a sectional view showing a schematic construction of the sucking/holding cylinder of the apparatus for treating the inner peripheral surface of the tube-shaped film and that of a laser beam-irradiating section thereof.

FIG. 2 is a sectional view showing a schematic construction of the sucking/holding cylinder of the apparatus for treating the inner peripheral surface of the tube-shaped film and that of a laser beam-irradiating section thereof. Upon termination of the application of the property-improving auxiliary agent, the inner peripheral surface of the tube-shaped film 7 is irradiated uniformly with ultraviolet laser beams after the auxiliary agent is dried. Then, the applying section 8 shown in FIG. 1 is removed from the sucking/holding cylinder 1. Then, the sucking/holding cylinder 1 makes a uniform rotary motion and a uniform linear motion instantaneously, with a laser beam-irradiating section 11 inserted thereinto, similarly to the property-improving auxiliary agent-applying process. In the case of the laser beam-irradiating section 11, in order to prevent a change of length of the optical path between a laser beam generation device and the inner peripheral surface of the film 7, it is preferable not to move the laser beam-irradiating section 11 linearly. Thus, preferably, the sucking/holding cylinder 1 makes a uniform rotary motion and a uniform linear motion simultaneously, with the laser beam-irradiating section 11 stationary. It is possible to rotate the laser beam-irradiating section 11 and move the sucking/holding cylinder 1 linearly. But it is possible to move the laser beam-irradiating section 11 linearly if it is possible to ignore the influence on the surface treatment given by a small change of the length of the optical path. The laser beam-irradiating section 11 has a cylinder 12 extending straight in the axial direction of the sucking/holding cylinder 1 so as to guide laser beams emitted by a laser beam generation device 24 (see FIG. 3); and accommodates a mirror 13 provided at the leading end of the cylinder 12, with the mirror 13 inclined by 45° with the axial direction of the sucking/holding cylinder 1. Thus, laser beams traveling linearly along the axis of the sucking/holding cylinder 1 are reflected by the mirror 13 by 90° and are incident on the inner peripheral surface of the film 7 at right angles therewith.

Figure 3:
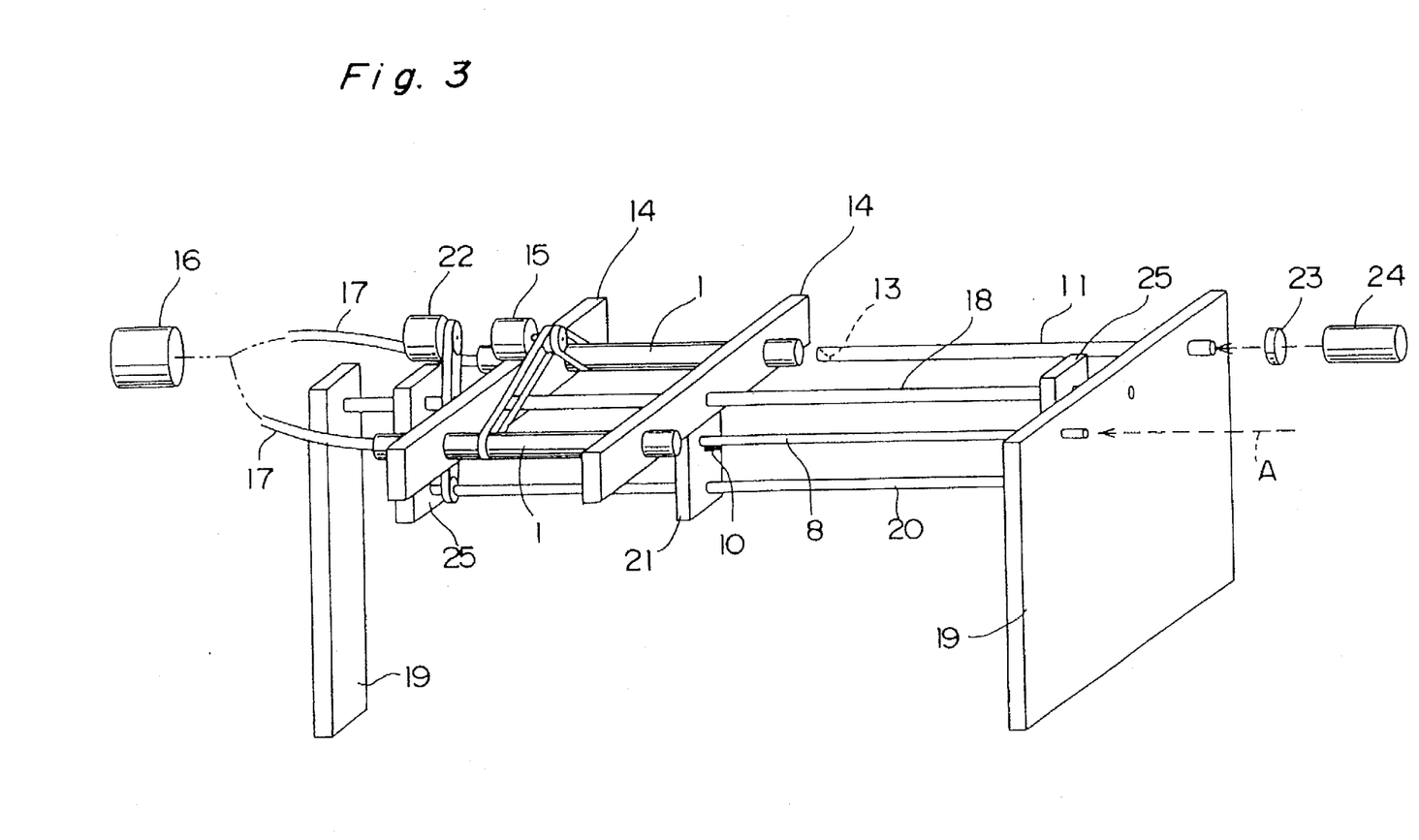
FIG. 3 is a perspective view showing a schematic construction of the apparatus for treating the inner peripheral surface of the tube-shaped film.

FIG. 3 is a perspective view showing a schematic construction of the apparatus for treating the inner peripheral surface of the tube-shaped film. The apparatus has two sucking/holding cylinders 1 connected with the vacuum pump 16 through vacuum pipes 17. Although one vacuum pump 16 is provided for two sucking/holding cylinders 1 in this embodiment, one vacuum pump 16 may be provided for each sucking/holding cylinder 1. The two sucking/holding cylinders 1 are rotatably supported at opposite ends thereof by respective movable frames 14. A driving motor 15 for rotating the sucking/holding cylinders 1 is mounted on one movable frame 14. The driving force of the driving motor 15 is transmitted to each sucking/holding cylinder 1 by means of a belt spanned the driving motor 15 and each sucking/holding cylinder 1.

A guide bar 18 extends through the center of the movable frames 14, with each end of the guide bar 18 fixed to a respective fixing frame 19. Reference numerals 25 of FIG. 3 denote rotary frames rotatable on the guide bar 18. A ball screw 20 positioned below the guide bar 18 extends in parallel therewith. Each end of the ball screw 20 is rotatably supported by a respective rotary frame 25. An extended portion 21 extends downward from one movable frame 14 and has a nut engaging the ball screw 20. That is, with the rotation of the ball screw 20, both movable frames 14 move linearly in parallel with the ball screw 20 and the guide bar 18. A motor 22 for rotating the ball screw 20 is mounted on one of the rotary frames 25. The driving force of the driving motor 22 is transmitted to the ball screw 20 by means of a belt spanned therebetween. That is, the driving motor 22 serves as a means for driving the sucking/holding cylinders 1 linearly.

The applying section 8 and the laser beam-irradiating section 11 are positioned forward of the open sides of the sucking/holding cylinders 1. Each of the applying section 8 and the laser beam-irradiating section 11 is fixedly supported by one fixing frame 19. The laser beam-irradiating section 11 is connected with the laser beam generation device 24 through a condenser lens 23. The property-improving auxiliary agent is supplied to the applying section 8 through supply pipe 9, as shown by an arrow (A) of FIG. 3.

Description now is made of a method of treating the inner peripheral surface of the tube-shaped film 7 by using the above apparatus. A film made of copolymer of tetrafluoroethylene with perfluoroalkoxyethelene (PFA) is used as the tube-shaped film 7. The size of the film is 50 µm in thickness, 37 mm in diameter, and 450 mm in length. The vacuum pump 16 is driven, with the tube-shaped film 7 inserted into one of the sucking/holding cylinders 1 so as to hold the tube-shaped film 7 on the inner peripheral surface of the inner cylinder 2 by suction. The method of sucking the tube-shaped film 7 to the inner peripheral surface of the inner cylinder 2 by utilizing a negative pressure maintains the tube-shaped film 7 stably and further allows the property-improving auxiliary agent to be applied uniformly to the inner peripheral surface of the tube-shaped film 7 and allows the inner peripheral surface of the tube-shaped film 7 to be irradiated with laser beams uniformly, even though the tube-shaped film 7 is made of fluorine resin to be very thin and have very small friction, in an application process of the property-improving auxiliary agent and an irradiation process of laser beams as described below. In inserting the tube-shaped film 7 into the sucking/holding cylinders 1, gas pressure such as air pressure is instantaneously applied into the space surrounded by the tube-shaped film 7 before the vacuum pump 16 is driven, and then, the application of the gas pressure is stopped after the tube-shaped film 7 is held on the inner peripheral surface of the inner cylinder 2 by suction.

While the sucking/holding cylinder 1 is being rotated at a speed of 120 rpm by the driving motor 15, the sucking/holding cylinder 1 holding the tube-shaped film 7 therein is moved forward by the driving motor 22 toward the applying section 8 at a speed of 225 mm/min. Then, the property-improving auxiliary agent is discharged from the application brush 10 and is uniformly applied to the inner peripheral surface of the tube-shaped film 7. Thereafter, the driving motor 22 is reversed to move the sucking/holding cylinder 1 backward. As the property-improving auxiliary agent, the following solutions can be used: A water solution containing 0.5% of anthraquinone-2-sodium sulfonate; a water solution containing 0.8% of "SURFLON S-113" (perfluoroalkylcarboxylate) which is available from Asahi Glass Co., Ltd.; or an ethanol solution containing 1% of carbazole and 0.1% of "FLUORAD FC-430" (fluorinated alkylester) which is available from Sumitomo 3M Co., Ltd.

After the property-improving auxiliary agent is applied to the inner peripheral surface of the tube-shaped film 7, the entire apparatus is rotated on the guide bar 18 together with the rotary frames 25 to change the position of the sucking/holding cylinders 1.

After the property-improving auxiliary agent is dried, the sucking/holding cylinder 1 is rotated again at the speed of 120 rpm by the driving motor 15, with the sucking/holding cylinder 1 holding the tube-shaped film 7 therein being moved linearly by the driving motor 22 toward the laser beam-irradiating section 11 at the speed of 225 mm/min. The laser beam generation device 24 generates ultraviolet laser beams to irradiate the inner peripheral surface of the tube-shaped film 7 uniformly through the mirror 13. Thereafter, the driving motor 22 is reversed to move the sucking/holding cylinder 1 backward. As the ultraviolet laser beams, four shots of KrF excima laser beams which provide a high output reliably for a long time are irradiated on the inner peripheral surface of the tube-shaped film 7 at a fluence of 100 mJ/cm$^2$/pulse.

As a result of such treatment, the inner peripheral surface of the tube-shaped film 7 obtained a high degree of wettability. In a wettability test of JIS-K6768, the tube-shaped film 7 has a wettability index higher than 56.

In the above-described example, the inner peripheral surface of the tube-shaped film 7 is irradiated with ultraviolet laser beams after the property-improving auxiliary agent is applied thereto. The sucking/holding cylinder 1 and the applying section 8 also can be used to only perform the process of applying a liquid chemical to the inner peripheral surface of the tube-shaped film 7 without irradiating the inner peripheral surface thereof with laser beams.

Figure 4:
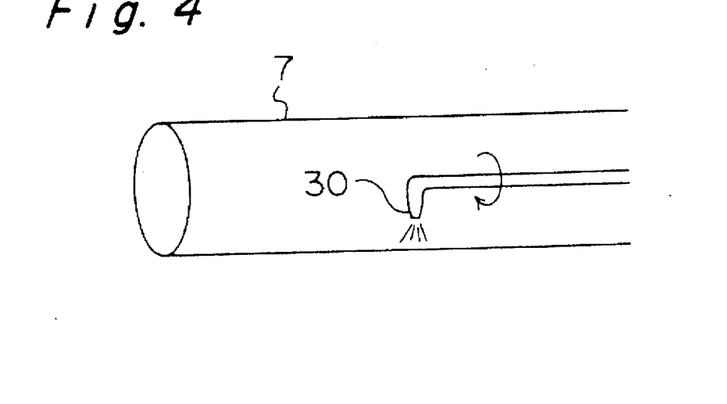
FIGS. 4, 5, 6, 7 and 8 are explanatory views showing respective examples of a method of supplying the property-improving auxiliary agent to the inner peripheral surface of the tube-shaped film.
Figure 5:
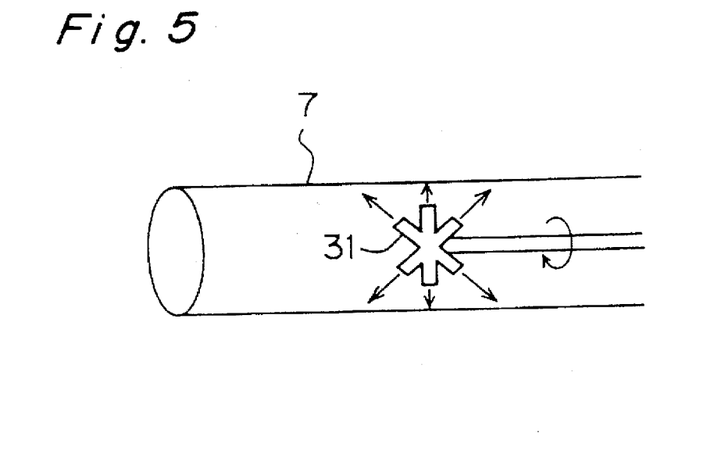

Instead of using the application brush 10, nozzles as shown in FIGS. 4 and 5, not showing the sucking/holding cylinder, may be used to apply the property-improving auxiliary agent to the inner peripheral surface of the tube-shaped film 7. In an example shown in FIG. 4, the auxiliary agent is jetted in only one direction from a nozzle 30. In an example shown in FIG. 5, the auxiliary agent is jetted radially from a nozzle 31 having a plurality of jetting openings. The jetting openings of the nozzle 31 are arranged at regular intervals in the circumferential direction of the nozzle 31. As the number of the jetting openings increases, the auxiliary agent can be jetted therefrom to the inner peripheral surface of the tube-shaped film 7 more uniformly. In addition, the shaft of the nozzle 30 and that of the nozzle 31 may be rotated as shown by arrows in FIGS. 4 and 5. In an example shown in FIG. 6, a disk 33 mounted at the leading end of a shaft 32 is rotated to disperse by centrifugal force the property-improving auxiliary agent which has attached to the rotating disk 33. In this manner, the auxiliary agent can be supplied to the inner peripheral surface of the tube-shaped film 7. In the example shown in FIG. 6, two supply pipes 34 are provided in parallel with the shaft 32 such that the outlets of the supply pipes 34 are open in close proximity to the surface of the center of the disk 33 so as to supply the auxiliary agent flowing out from the outlets of the supply pipes 34 to the surface of the disk 33. The auxiliary agent which has flowed out from the outlets to the vicinity of the center of the disk 33 is uniformly dispersed over 360° on the inner peripheral surface of the tube-shaped film 7. Instead of the two supply pipes 34 provided above and below the shaft 32, only one supply pipe 34 may be provided or three supply pipes 34 may be provided by positioning them at intervals of 120°. It is possible to form a hollow cylindrical shaft 32 to flow the property-improving auxiliary agent through the duct thereof and position the leading end of the duct at the surface of the disk 33 to disperse the auxiliary agent as shown by dotted arrows in FIG. 6. It is also possible that the supply pipe is provided such that the outlets of the supply pipe is open in close proximity to the surface of the center of the disk 33 at the left side of the disk 33 in FIG. 6. In an example shown in FIG. 7, the property-improving auxiliary agent is dispersed entirely on the inner peripheral surface of an inclined tube-shaped film 7, while the tube-shaped film 7 is rotated on the axis thereof.

Figure 6:
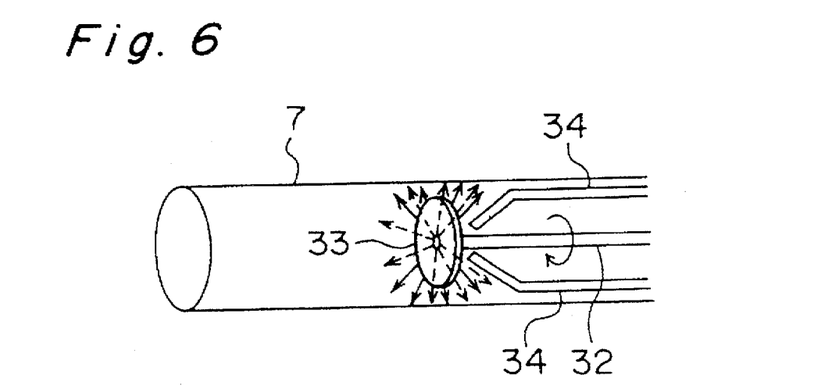

In the examples shown in FIGS. 4 through 6, the property-improving auxiliary agent is supplied to the inner peripheral surface of the tube-shaped film 7 by an agent-supply means with the former not in contact with the latter. In supplying the auxiliary agent to the inner peripheral surface of the tube-shaped film 7 by such supply means by rotating the sucking/holding cylinder 1, centrifugal force acts on the auxiliary agent supplied to the inner peripheral surface of the tube-shaped film 7. Because the centrifugal force acts uniformly on the entire inner peripheral surface of the tube-shaped film 7, the auxiliary agent supplied thereto is uniformly distributed thereon. The centrifugal force acts on the tube-shaped film 7 in the same direction, i.e. radially outwardly, as that of the sucking/holding force of the sucking/holding cylinder 1. Thus, even though the vacuum pump 16 may suck the tube-shaped film 7 onto the inner peripheral surface of the inner cylinder 2 incompletely, the centrifugal force allows the tube-shaped film 7 to be reliably held on the inner peripheral surface of the inner cylinder 2.

Figure 7:
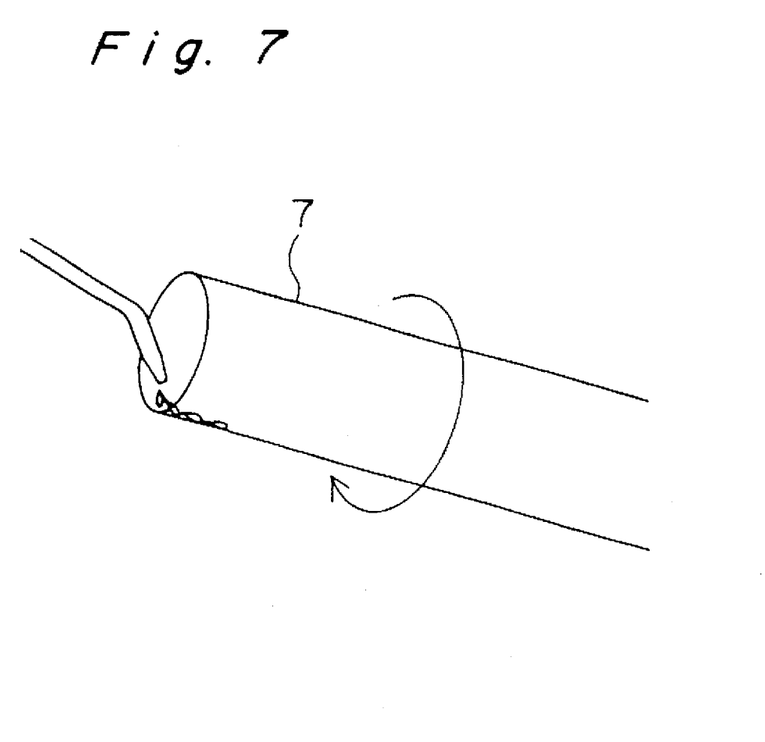

In the example shown in FIG. 7, the property-improving auxiliary agent is supplied to the tube-shaped film 7 by an agent-supply means with the former not in contact with the latter. In this example, the holding cylinder is inclined and rotated at a number of rotations adjusting itself to the viscosity of the property-improving auxiliary agent while the auxiliary agent is being dripped. As a result, the auxiliary agent which has dripped moves in the circumferential direction of the holding cylinder due to the rotation thereof, while the property-improving auxiliary agent is flowing downward by gravity. In this manner, the auxiliary agent can be distributed uniformly on the entire inner peripheral surface of the tube-shaped film 7.

In drying the property-improving auxiliary agent applied to the inner peripheral surface of the tube-shaped film 7, air in contact with the surface of the auxiliary agent flows relative thereto by rotating the holding cylinder, thus accelerating the speed of drying of the auxiliary agent. The centrifugal force prevents the auxiliary agent on the inner peripheral surface of the tube-shaped film 7 from flowing down due to gravity. Accordingly, the centrifugal force in combination with the prompt drying of the auxiliary agent allows the auxiliary agent to be dispersed uniformly on the inner peripheral surface of the tube-shaped film 7.

Figure 8:
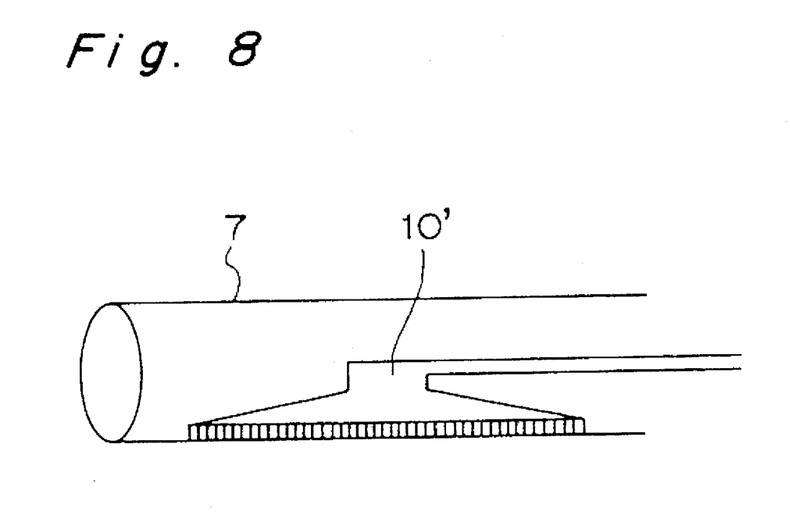

FIG. 8 is a modification of the example shown in FIG. 1. The application brush 10 shown in FIG. 1 has a width equal to the entire length of the tube-shaped film 7. In this example, an application brush 10' and the holding cylinder are merely rotated relative to each other without making a linear motion relative to each other. Needless to say, because the agent-supply means shown in FIGS. 5 and 6 jet or scatter the property-improving auxiliary agent uniformly across the circumference of the tube-shaped film 7, the agent-supply means and the holding cylinder 1 are moved only linearly relative to each other.

An ammonium solution of metallic sodium or tetrahidrofuran solution containing a complex of sodium and naphthalene is supplied by the agent-supply means shown in FIGS. 4 through 7 into the space surrounded by a tube made of fluorine resin held on the inner peripheral surface of the tube-shaped film 7. After the solution is in contact with the inner peripheral surface of the tube-shaped film 7 for a predetermined period of time, alcohol and then water are supplied thereto by equivalent of the agent-supply means. Then, the solution is dried. As a result, the surface of the tube made of fluorine resin is made to have a high degree of wettability.

As substances to have the property of the surface thereof improved by being irradiated with ultraviolet laser beams, in addition to fluorine resin, the following substances can be used: Polyester, polyether ether ketone, polyimide, polyether ketone, polyphenylenesulfide, aromatic polyamide, polyarylate, polyetherimide, polyamideimide, polysulfon, polyethersulfone, polystyrene, polymethylmethacrylate, polyurethane, and a mixture thereof.

Ultraviolet-absorbing substances may be contained in polyethylene, polypropylene, and polyamide or applied to the surface thereof. In this manner, polyethylene, polypropylene, and polyamide can have the surface thereof improved similarly to fluorine resin by being irradiated with ultraviolet laser beams.

It is unnecessary to apply the property-improving auxiliary agent to the inner peripheral surface of the tube-shaped film 7 if the tube-shaped film is made of fluorine resin containing an ultraviolet-absorbing substance. In this case, the holding means and the laser beam-irradiating means can be used to only irradiate the inner peripheral surface of the tube-shaped film 7.

A conductive substance such as carbon black may be contained in the tube-shaped film made of fluorine resin, depending on use.

There are no folds formed on the inner peripheral surface of the tube-shaped film 7 obtained in the aforementioned manners.

Although the present invention has been fully described in connection with preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A tube-shaped film, made of fluorine resin, having a fold-free, smooth, and uniform inner peripheral surface formed by applying pre-treatment liquid containing an ultraviolet-absorbing compound and fluorosurfactant to an inner peripheral surface thereof and subsequently irradiating the inner peripheral surface thereof with ultraviolet laser beams to impart adhesiveness and wettability thereto.

2. The tube-shaped film according to claim 1, wherein the fluorine resin contains a conductive substance.

3. An apparatus for treating an inner peripheral surface of a tube-shaped film, said apparatus comprising:
   a suction/holding means having an inner cylinder having a plurality of holes formed therein to hold the tube-shaped film thereon by sucking the tube-shaped film thereto, and an outer cylinder surrounding said inner cylinder and connected with a negative pressure source to form a negative space between said inner cylinder and said outer cylinder;
   a first driving means for driving said suction/holding means so that said suction/holding means makes a uniform linear motion along the axis thereof;
   a second driving means for driving said suction/holding means so that said suction/holding means makes a uniform rotary motion around said axis thereof; and
   a treatment means for treating the inner peripheral surface of the tube-shaped film held by said suction/holding means, according to the linear motion and the rotary motion of said suction/holding means.

4. An apparatus for treating an inner peripheral surface of a tube-shaped film, said apparatus comprising:
   a holding means for holding a tube-shaped film on the inner peripheral surface of a cylindrical body with a cylindrical configuration of the tube-shaped film being maintained; and
   a treatment means to be inserted into said cylindrical body to treat the inner peripheral surface of the tube-shaped film held on said inner peripheral surface of said cylindrical body.

5. The apparatus according to claim 4, wherein said holding means holds the tube-shaped film on said inner peripheral surface of said cylindrical body, with the cylindrical configuration of the tube-shaped film being maintained by means of at least one of suction, pressurization, adhesion, and static electricity.

6. The apparatus according to claim 5, wherein said cylindrical body is an inner cylinder having a plurality of holes to suck and hold the tube-shaped film thereon, and said holding means comprises said inner cylinder and an outer cylinder surrounding said inner cylinder and connected with a negative pressure source to form a negative space between said inner cylinder and said outer cylinder.

7. The apparatus according to claim 6, wherein said holding means and said treatment means make a uniform linear motion relative to each other along the axis of said holding means and/or a uniform rotary motion relative to each other around said axis of said holding means.

8. The apparatus according to claim 4, wherein the holding means and the treatment means make a uniform linear motion relative to each other along the axis of the holding means and/or a uniform rotary motion relative to each other on the axis of the holding means.

9. The apparatus according to claim 5, wherein the holding means and the treatment means make a uniform linear motion relative to each other along the axis of the holding means and/or a uniform rotary motion relative to each other on the axis of the holding means.

10. A method of treating an inner peripheral surface of a tube-shaped film, said method comprising the steps of:
   a first step of holding said tube-shaped film made of fluorine resin on the inner peripheral surface of a holding cylinder having a large number of holes, by means of a negative pressure generated between said holding cylinder and an outer cylinder;
   a second step of supplying said inner peripheral surface of said tube-shaped film with a pre-treatment solution containing an ultraviolet-absorbing compound and fluorosurfactant and attaching said pre-treatment solution thereto by means of a supply means inserted into said holding cylinder holding said tube-shaped film, by linearly moving said holding cylinder and said supply means relative to each other at a uniform speed along the axis of said holding cylinder and rotating said holding cylinder and said supply means relative to each other at a uniform speed around said axis of said holding cylinder; and
   a third step of irradiating said inner peripheral surface of said tube-shaped film to which said pre-treatment solution has been attached with ultraviolet laser beams by refracting said ultraviolet laser beams guided along the axial direction of said holding cylinder toward said inner peripheral surface of said tube-shaped film by means of an optical means inserted into said holding cylinder holding said tube-shaped film, by linearly moving said holding cylinder and said optical means relative to each other at a uniform speed along said axis of said holding cylinder and rotating said holding cylinder and said optical means relative to each other at a uniform speed around said axis of said holding cylinder.

11. The method according to claim 10, wherein:

the supply of t said pre-treatment solution to said inner peripheral surface of said tube-shaped film to be performed at said second step is carried out without contact between said inner peripheral surface of said tube-shaped film and said supply means; and during the uniform rotary motion of said molding cylinder and said supply means to be made relative to each other, at least said holding cylinder makes said uniform rotary motion along said axis thereof, and said uniform rotary motion of said holding cylinder is made at a speed higher than a speed at which centrifugal force acts on said pre-treatment solution so that said pre-treatment solution supplied to said inner peripheral surface of said tube-shaped film can be uniformly distributed thereon.

12. The method according to claim 11, further comprising a fourth step, provided between said second step and said third step of drying pre-treatment solution which has been attached to said inner peripheral surface of said tube-shaped film, wherein during said fourth step said holding cylinder rotates at said speed higher than said speed at which centrifugal force acts on said pre-treatment solution so that said pre-treatment solution supplied to said inner peripheral surface of said tube-shaped film can be uniformly distributed thereon.

13. The method according to claim 10, further comprising a fourth step, provided between the second step and the third step, for drying the pre-treatment solution which has attached to the inner peripheral surface of the tube-shaped film, wherein at fourth step, the holding means (2) rotates at the speed higher than the speed at which the centrifugal force acts on the pre-treatment solution so that the pre-treatment solution supplied to the inner peripheral surface of the tube-shaped film can be uniformly distributed thereon.

14. A method of treating an inner peripheral surface of a tube-shaped film, said method comprising the steps of:

a first step of holding said tube-shaped film made of fluorine resin containing an ultraviolet-absorbing substance on the inner peripheral surface of a holding cylinder having a large number of holes, by means of a negative pressure; and a second step of irradiating said inner peripheral surface of said tube-shaped film with ultraviolet laser beams guided along the axial direction of said holding cylinder by refracting said ultraviolet laser beams toward said inner peripheral surface of said tube-shaped film by means of an optical means, while said holding cylinder holding said tube-shaped film by suction makes a uniform linear motion along the axis thereof and a uniform rotary motion around said axis thereof.

15. A tube-shaped film, made of fluorine resin, containing an ultraviolet-absorbing compound and having a fold-free, smooth, and uniform inner peripheral surface formed thereon by irradiating the tube-shaped film with ultraviolet laser beams to impart adhesiveness and wettability thereto.

16. The tube-shaped film according to claim 2, wherein the fluorine resin contains a conductive substance.

* * * * *